(12) United States Patent
Omata et al.

(10) Patent No.: US 7,111,715 B2
(45) Date of Patent: Sep. 26, 2006

(54) CENTRIFUGAL TYPE CLUTCH BRAKE DEVICE

(75) Inventors: Akio Omata, Yamanashi (JP); Toshihito Nishiyama, Yamanashi-ken (JP)

(73) Assignees: Omata Manufacturing Co., Ltd., Yamanashi (JP); ASK Technica Corporation, Yamanashi-ken (JP)

( * ) Notice: Subject to any disclaimer, the term of this patent is extended or adjusted under 35 U.S.C. 154(b) by 121 days.

(21) Appl. No.: 10/964,767

(22) Filed: Oct. 15, 2004

(65) Prior Publication Data

US 2005/0109573 A1    May 26, 2005

(30) Foreign Application Priority Data

Nov. 25, 2003    (JP)    ............................. 2003-393914

(51) Int. Cl.
   *F16D 67/02*    (2006.01)
(52) U.S. Cl. ................. 192/16; 192/105 R; 192/103 C
(58) Field of Classification Search .................... None
   See application file for complete search history.

(56) References Cited

U.S. PATENT DOCUMENTS 3,857,180 A * 12/1974 Dooley ......................... 30/383
4,143,747 A *  3/1979 Langieri et al. ............... 192/43
5,241,871 A *  9/1993 McKnight et al. ............ 74/7 C

\* cited by examiner

*Primary Examiner*—Saul Rodriguez
(74) *Attorney, Agent, or Firm*—Wenderoth, Lind & Ponack, L.L.P.

(57) ABSTRACT

Disclosed is a centrifugal type clutch brake device in which a ring-like drive disc is caused to move vertically in synchronism with the engagement/disengagement of a centrifugal clutch to thereby engage/disengage the brake, thus attaining a simplification in structure. In the centrifugal type clutch brake device of the present invention, the ring-like drive disc (11) is connected to the lower portion of a centrifugal clutch housing (21) of a centrifugal clutch (22) through the intermediation of a moving device (30), and the brake is engaged/disengaged in synchronism with engagement/disengagement of the centrifugal clutch (22).

4 Claims, 7 Drawing Sheets

CENTRIFUGAL TYPE CLUTCH BRAKE DEVICE

BACKGROUND OF THE INVENTION

1. Field of the Invention

The present invention relates to a centrifugal type clutch brake device, and more specifically to a novel, improved centrifugal type clutch brake device having a substantially more simplified structure in which a moving means consisting of a screw, pin or the like is provided between a centrifugal clutch housing and a ring-like drive disc of a centrifugal clutch and in which, after the centrifugal clutch is disengaged, the ring-like drive disc is moved axially upwards to effect braking.

2. Description of the Related Art

Figure 6:
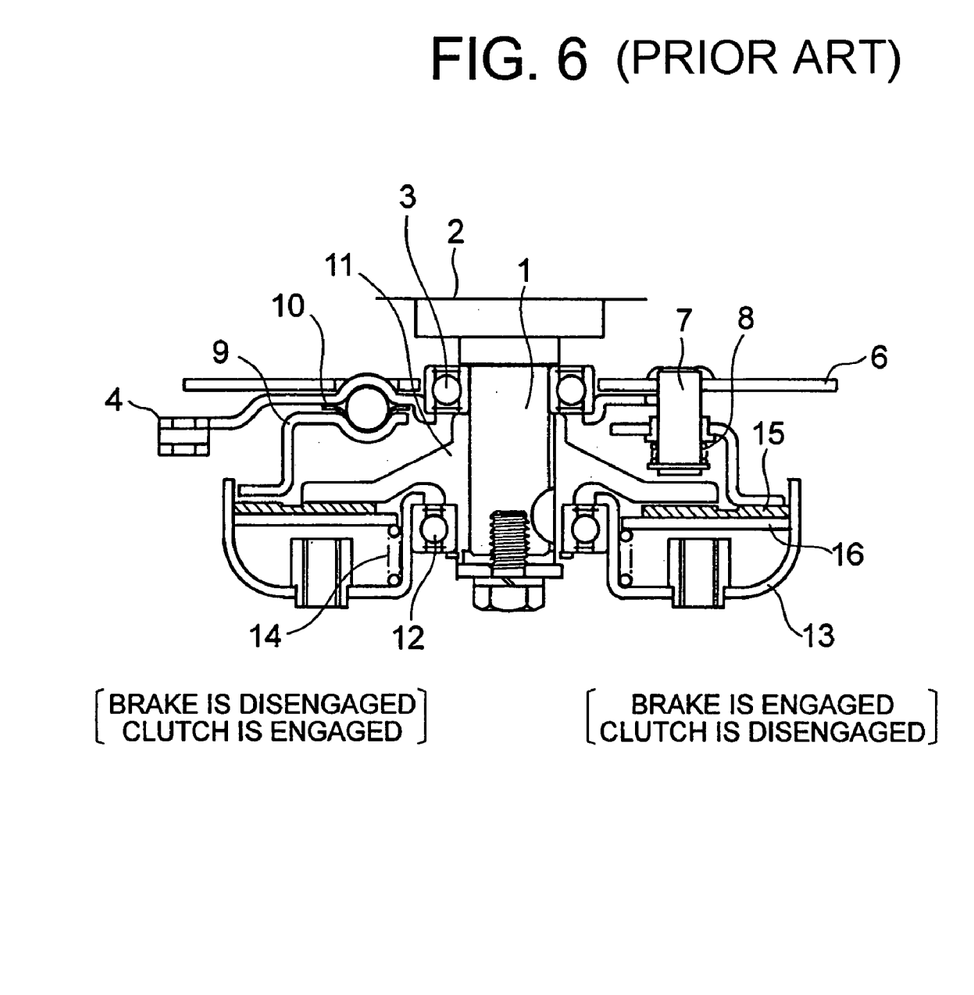
FIG. 6 is a sectional view showing a conventional construction.
Figure 7:
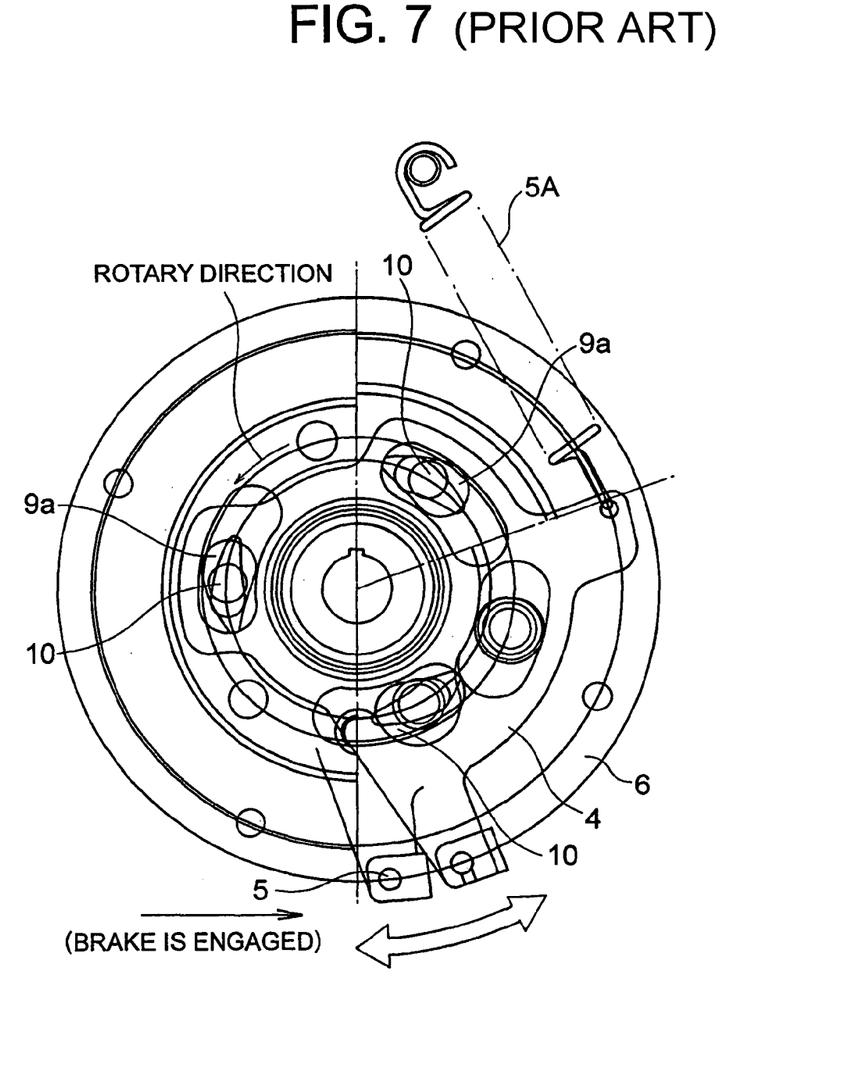
FIG. 7 is a schematic plan view of FIG. 6.

FIGS. 6 and 7 schematically show how a conventionally used clutch brake device of the type described above is formed according to an existing technique, with the titles of the relevant documents not being disclosed.

In FIGS. 6 and 7, numeral 1 indicates a rotation shaft provided on the side of a driving means 2, such as an engine, and on the upper portion of the rotation shaft 1, there is provided an actuator plate 4 through the intermediation of a first bearing 3 so as to be rotatable by means of an operation system cable 5. On the back side of this actuator plate 4, there is provided an actuator 9 mounted to a plate 6 on the driving means 2 side through the intermediation of a column 7 and a set spring 8 so as to be vertically movable (In FIG. 6, it is shown in the raised and lowered states, respectively, on the right-hand side and the left-hand side with respect to the center line of the drawing).

Between recesses 4a and 9a of the actuator plate 4 and the actuator 9, there is provided a ball 10 with a retainer.

Fixed to the middle position of the rotation shaft 1 is a drive disc 11 substantially in the form of a disc, and the lower portion of this drive disc 11 is equipped with a blade holder 13 through the intermediation of a second bearing 12, with the blade holder 13 being connected to a driven member, such as a blade (not shown).

Arranged inside the blade holder 13 is a facing plate 16 urged by a clutch spring 14 and having a facing 15, with the lower surface of the drive disc 11 and the lower surface of the actuator 9 being capable of coming into contact with and moving away from the facing 15.

Next, the operation of this device will be described. The left-hand side portion of the device in FIG. 6 is connected to the operation cable 5. In the state in which the brake is disengaged and the clutch is engaged, the blade (not shown) connected to the blade holder 13 rotates with the rotation of the rotation shaft 1, which is driven by the driving means 2.

When, in the above-described state, the operation system cable 5 is restored by a brake spring 5A, the actuator plate 4 rotates, and the ball 10 with a retainer is detached from the recess 9a. The actuator 9 is lowered as shown on the right-hand side of FIG. 6 and comes into contact with the facing 15. At the same time, the contact between the drive disc 11 and the facing 15 is canceled, and the rotation of the rotation shaft 1 is not transmitted to the blade holder 13, with the result that the rotation of the blade holder 13 is stopped.

The conventional clutch brake device, constructed as described above, has the following problem.

That is, to rotate and stop the blade holder, it is necessary to rotate the actuator and vertically move the actuator through the ball, resulting in a rather complicated clutch/brake mechanism. Further, a dedicated cable and an operating lever are indispensable to the operation system, resulting in high cost and necessitating novel designing of the apparatus main body.

As is admitted, a very high level of safety is required of the device. However, since it does not allow post-mounting to a novel/used apparatus, the device has not very much found its way throughout foreign countries, and it is very difficult for the device to meet the recent demand for lower price.

SUMMARY OF THE INVENTION

It is an object of the present invention to make it possible, through a combination of a centrifugal clutch and a moving means, to automatically engage/disengage a clutch and a brake according solely to the rotation speed of a rotation shaft, without involving any manual operation.

A centrifugal type clutch brake device according to the present invention includes: a centrifugal clutch shoe fixed to a rotation shaft rotated by a driving means; a centrifugal clutch housing rotatably provided on the rotation shaft through the intermediation of a bearing and forming a centrifugal clutch with the centrifugal clutch shoe; a ring-like drive disc provided at an end of the centrifugal clutch housing through the intermediation of a driving means so as to be axial movable; a driven member connected to the ring-like drive disc; and first and second braking frictional members provided on both sides of a stationary plate provided on the driving means side and capable of coming into contact with the centrifugal clutch housing and the ring-like drive disc, respectively. In the centrifugal type clutch brake device, when, in a state in which the centrifugal clutch is engaged to cause the ring-like drive disc to be rotated through the moving means, a rotating speed of the rotation shaft is reduced and the centrifugal clutch is disengaged to cause the ring-like drive disc to rotate faster than the centrifugal clutch housing, the ring-like drive disc moves to the centrifugal clutch housing side through the moving means; and the ring-like drive disc comes into sliding contact with the second braking frictional member to stop rotating. Further, the moving means includes a threaded portion formed on a lower peripheral surface of the centrifugal clutch housing and an inner threaded portion formed on an inner surface of the ring-like drive disc and threadedly engaged with the threaded portion. Further, the moving means includes at least three pins provided on the ring-like drive disc and a cam lead hole formed in the centrifugal clutch housing and adapted to be engaged with the pins, in which the cam lead hole is formed so as to have an inclination angle $\theta$ with respect to a straight line perpendicular to an axial direction of the centrifugal clutch housing. Further, each of the pins has a spherical portion at a distal end thereof.

The centrifugal type clutch brake device of the present invention, constructed as described above, provides the following advantages.

Due to the construction in which the moving means consisting of the pin and the cam lead hole is provided between the centrifugal clutch housing of the centrifugal clutch and the ring-like drive disc, the centrifugal clutch being engaged/disengaged according to the rotation speed of the rotation shaft, with the ring-like drive disc being axially moved to engage/disengage the brake, the configurations of the components have been simplified as compared with the conventional construction, and the number of components has been substantially reduced, thereby making it possible to easily achieve a reduction in cost and an improvement in reliability.

DESCRIPTION OF THE PREFERRED EMBODIMENTS

A preferred embodiment of a centrifugal type clutch brake device of the present invention will now be described with reference to the drawings.

In the drawings, the components that are the same as or equivalent to those of the conventional example are indicated by the same reference numerals.

Figure 1:
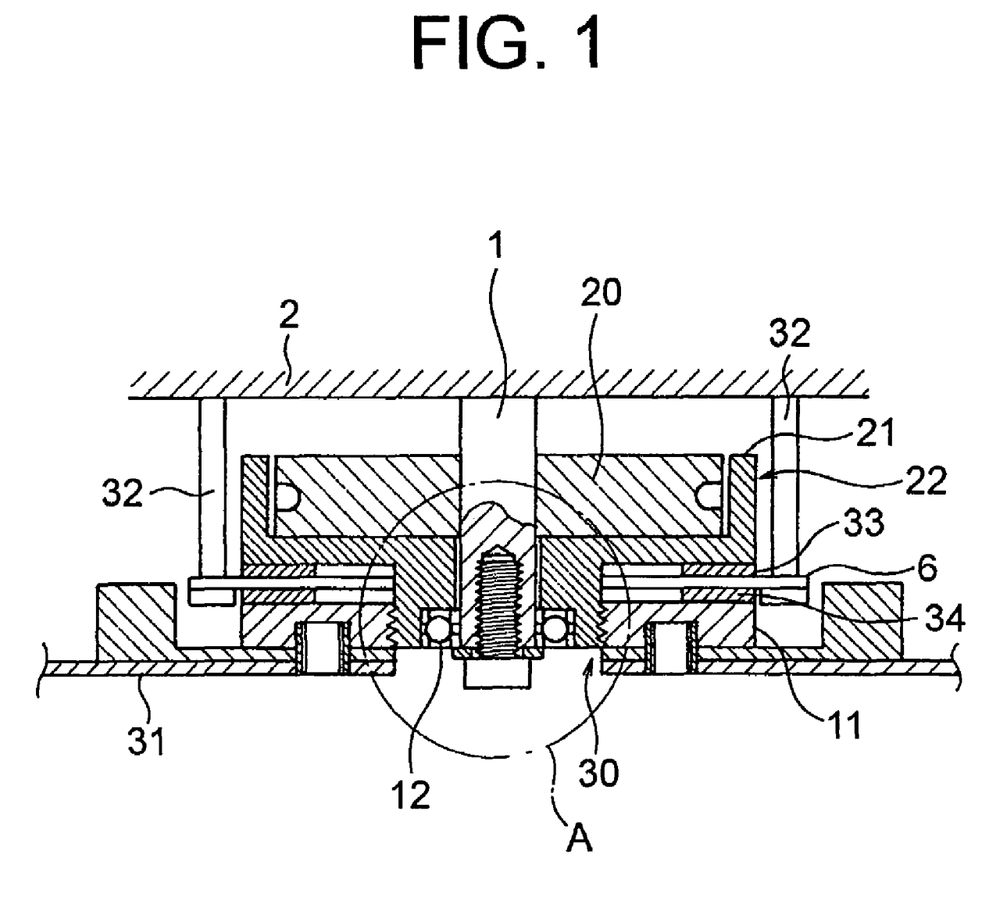
FIG. 1 is a sectional view of a centrifugal clutch brake device according to the present invention.

In FIG. 1, numeral 1 indicates a rotation shaft rotated by a driving means 2, such as an engine or a motor. Fixed to substantially the middle portion of the rotation shaft 1 is a well-known centrifugal clutch shoe 20 (as disclosed, for example, in JP 2003-269495 A). Apart from the one as disclosed in the above-mentioned publication, it is also possible to adopt clutch shoes of various types, such as a well-known trisectional type or a bisectional type using a spring.

In the portion of the rotation shaft 1 under the centrifugal clutch shoe 20, there is provided a centrifugal clutch housing 21 through the intermediation of a bearing 12 so as to be rotatable independently of the rotation shaft 1.

The centrifugal clutch shoe 20 and the centrifugal clutch housing 21 form a centrifugal clutch 22, which is engaged/disengaged according to the RPM of the rotation shaft 1 (which, for example, is set to 4000 RPM and 2000 RPM).

In the outer periphery of the lower portion of the centrifugal clutch housing 21, there is provided a ring-like drive disc 11 connected to the clutch housing; through the intermediation of a moving means 30 so as to be axially movable and capable of undergoing drag.

Connected to the lower surface of the ring-like drive disc 11 is a driven member 31 consisting of a blade or the like for mowing, etc.

Between the centrifugal clutch housing 21 and the ring-like drive disc 11, there is fixedly arranged a stationary plate 6 through the intermediation of columns 32 provided on the driving means 2 side. On the two sides of this stationary plate 6, there are provided first and second braking frictional members 33 and 34, and the first braking frictional member 33 is constantly in slight sliding contact with the back surface of the centrifugal clutch housing 21.

Figure 2:
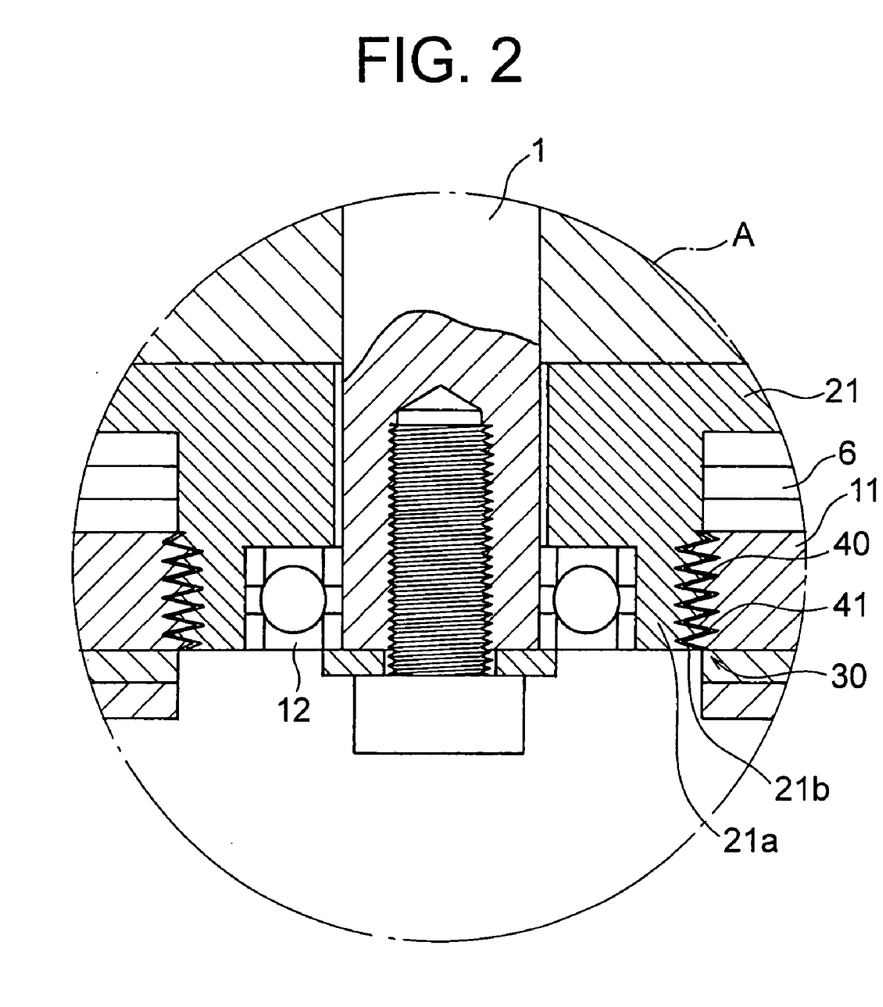
FIG. 2 is an enlarged main-portion sectional view of FIG. 1.

FIG. 2 is an enlarged schematic view of the main portion A of FIG. 1, showing how the moving means 30 is formed by a spring.

That is, formed on a lower peripheral surface 21b of a lower portion 21a of the centrifugal clutch housing 21 is a threaded portion 40, which is threadedly engaged with an inner threaded portion 41 formed on the inner surface of the ring-like drive disc 11.

The pitch, number of threads, and lead of the threaded portion 40 are determined so as to facilitate movement while rotating along the axial direction with respect to the centrifugal clutch housing 21, and are set as appropriate taking into account the weight of the driven member 31 to be mounted.

Next, the operation of this device will be described. First, when, in the state as shown in FIG. 1, the driving means 2 is at low speed and the rotation shaft 1 is rotating at low speed, the centrifugal clutch 22 is disengaged, so that exclusively the rotation shaft 1 makes idle running, whereas a running unit, such as a mowing machine (not shown), runs at low speed.

When, in this state, the accelerator of the running unit is operated in the accelerating direction, the rotation shaft 1 rotates at high speed, and the centrifugal clutch 22 is engaged, with the result that the rotation of the centrifugal clutch housing 21 is transmitted to the ring-like drive disc 11 through the moving means 30 to thereby rotate the driven member 31.

In this case, the threaded portion 40 is formed in an inverse thread configuration, so that the ring-like drive disc 11 rotates therewith while somewhat axially lowered with respect to the threaded portion 40; in this case, the second braking frictional member 34 and the ring-like drive disc 11 are out of contact with each other, which means the brake is disengaged.

When, in the above drive state, the rotating speed of the driving means 2 is reduced by operating the accelerator, the centrifugal clutch 22 is disengaged, and the rotating speed of the centrifugal clutch housing 21 is reduced, whereas the ring-like drive disc 11 tends to rotate faster than the centrifugal clutch housing 21 due to the inertia owing to the mass of the driven member 31; when the ring-like drive disc 11 rotates faster than the centrifugal clutch housing 21, even to a slight degree, the ring-like drive disc 11 is brought into the screw-up state with respect to the threaded portion 40, and the ring-like drive disc 11 is moved somewhat upwards in the axial direction to be brought into sliding contact with the second braking frictional member 34 to engage the brake, thereby bringing the machine to a stop.

Figure 3:
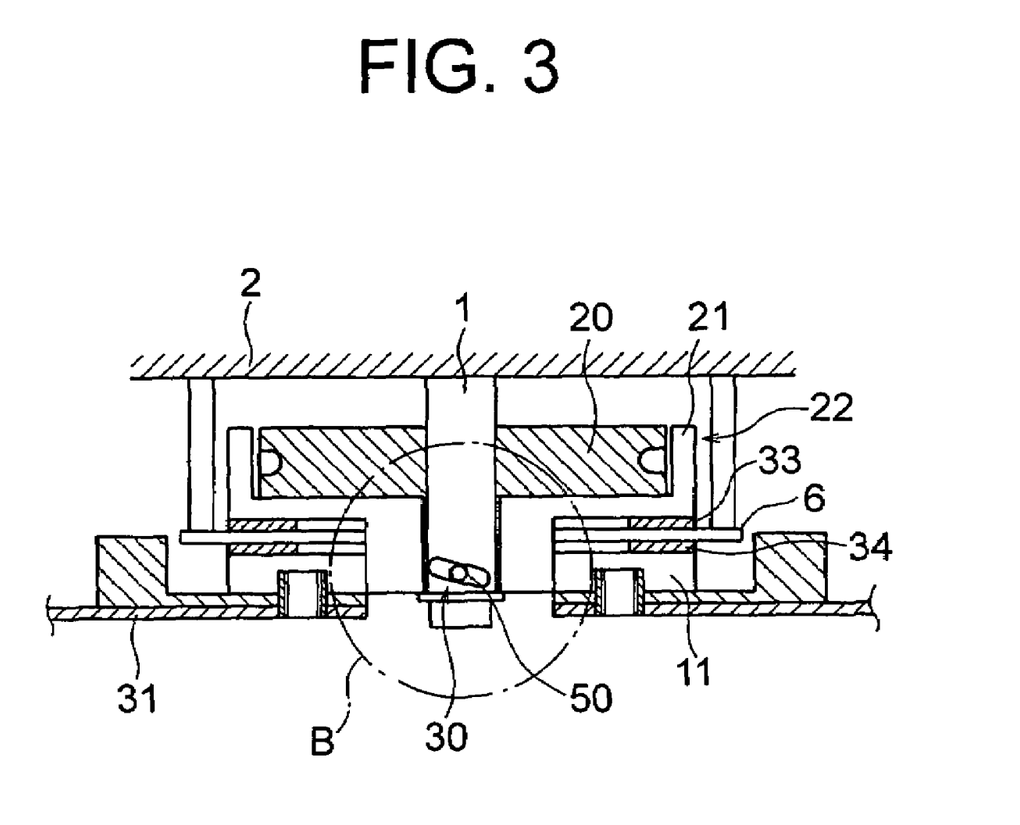
FIG. 3 is a sectional view of a modification of the device of FIG. 1.
Figure 4:
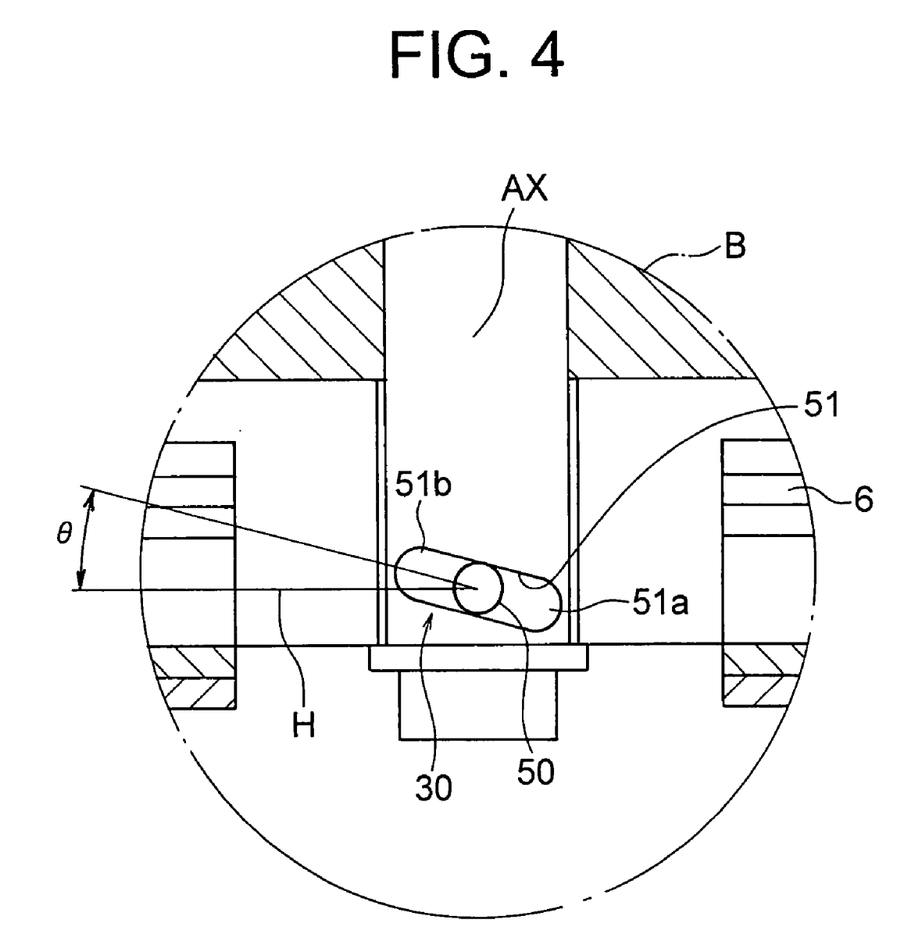
FIG. 4 is an enlarged main-portion sectional view of FIG. 3.

Next, FIGS. 3 and 4 show a modification of the moving means 30. The components that are the same as or equivalent to those of FIGS. 1 and 2 are indicated by the same reference numerals, and a description of such components will be omitted, the description being focused on the differences.

In this modification, the moving means 30 are formed by at least three pins 50 provided on the inner surface of the ring-like drive disc 11 so as to protrude inwardly and a cam lead hole 51 formed in the lower portion 21a of the centrifugal clutch housing 21.

The pins 50 are engaged with the cam lead hole 51, which is, as shown in FIG. 4, inclined by an inclination angle θ with respect to a radial straight line H perpendicular to the axial direction AX of the rotation shaft 1 and the centrifugal clutch housing 21.

Thus, when the centrifugal clutch 22 is engaged, and the ring-like drive disc 11 is rotating, the pins 50 are situated on the lower end 51a side of the cam lead hole 51 so that the ring-like drive disc 11 is lowered; when the rotating speed of the rotation shaft has been reduced and the centrifugal clutch 22 is disengaged, the pins 50 are situated on the upper end 51*b* side of the cam lead hole 51, and the ring-like drive disc 11 is raised to engage the brake.

Figure 5:
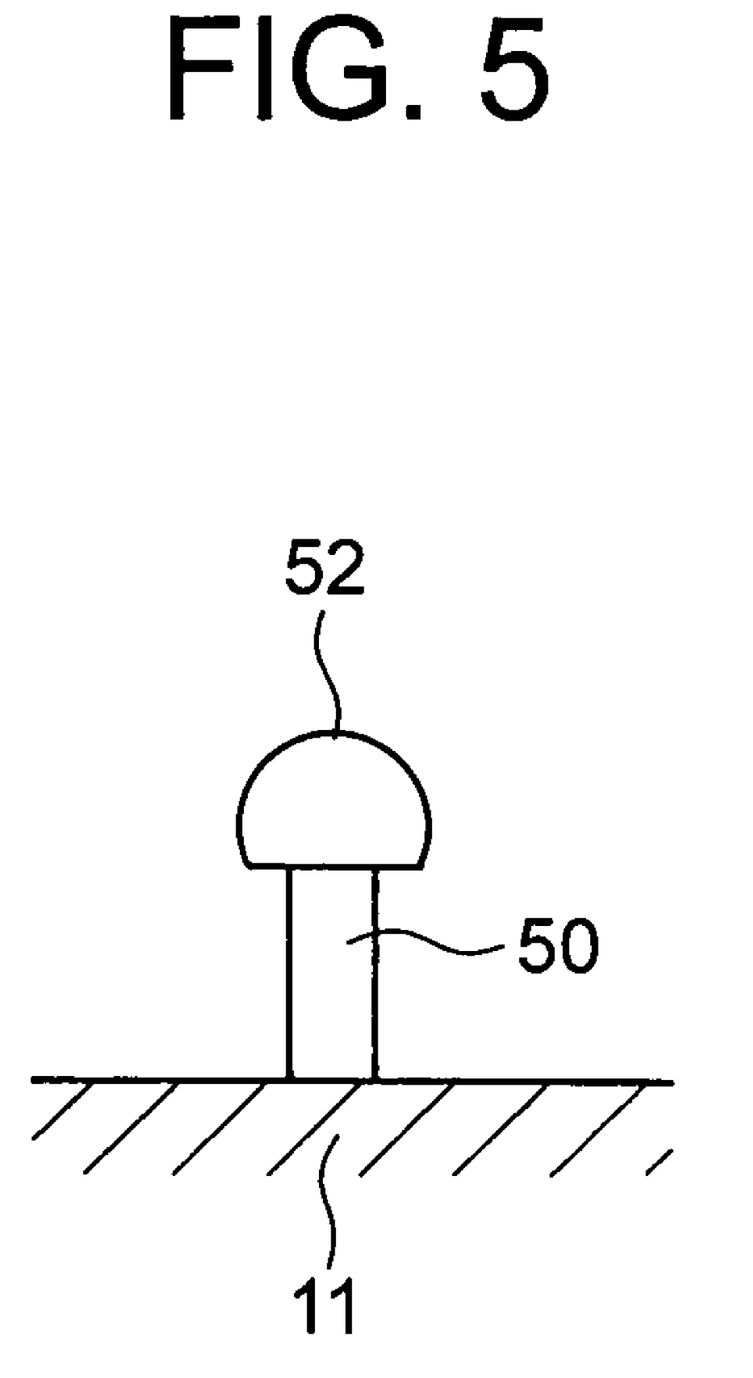
FIG. 5 is an enlarged view of a modification of a main portion of FIG. 3.

While in the above-described example the pins 50 are formed in a cylindrical configuration, the same effect can also be obtained when, as shown in FIG. 5, each pin 50 has a spherical portion 52 that is completely spherical or semi-spherical, and this spherical portion 52 is engaged with the cam lead hole 51. Further, while in the above-described example the driven member 31 consists of a blade, it is also possible to adopt a load other than a blade. Further, the lead of each of the threaded portions 40 and 41 and the inclination angle $\theta$ of the cam lead hole 51 are determined by the weight of the driven member 31, etc.

The present invention is applicable not only to a mowing machine but widely to various apparatuses, such as go-cart, agricultural machines, machine tools, and construction machinery.

What is claimed is:

1. A centrifugal type clutch brake device comprising:
   a centrifugal clutch shoe fixed to a rotation shaft;
   a driving means for rotatably driving the rotation shaft; a centrifugal clutch housing rotatably provided on the rotation shaft through the intermediation of a bearing and forming a centrifugal clutch with the centrifugal clutch shoe;
   a ring-like drive disc provided at an end of the centrifugal clutch housing through the intermediation of a moving means so as to be axial movable;
   a driven member connected to the ring-like drive disc; and
   first and second braking frictional members provided on both sides of a stationary plate provided on a driving means side of the ring-like drive disc and capable of coming into contact with the centrifugal clutch housing and the ring-like drive disc, respectively,
   wherein, when, in a state in which the centrifugal clutch is engaged to cause the ring-like drive disc to be rotated through the moving means, a rotating speed of the rotation shaft is reduced and the centrifugal clutch is disengaged to cause the ring-like drive disc to rotate faster than the centrifugal clutch housing, the ring-like drive disc moves towards the centrifugal clutch housing through the moving means, and the ring-like drive disc comes into sliding contact with the second braking frictional member to stop rotating.

2. A centrifugal type clutch brake device according to claim 1, wherein the moving means comprises a threaded portion formed on a lower peripheral surface of the centrifugal clutch housing and an inner threaded portion formed on an inner surface of the ring-like drive disc and threadedly engaged with the threaded portion.

3. A centrifugal type clutch brake device according to claim 1, wherein the moving means comprises at least three pins provided on the ring-like drive disc and a cam lead hole formed in the centrifugal clutch housing and adapted to be engaged with the pins, and wherein the cam lead hole is formed so as to have an inclination angle $\theta$ with respect to a straight line perpendicular to an axial direction of the centrifugal clutch housing.

4. A centrifugal type clutch brake device according to claim 3, wherein each of the pins has a spherical portion at a distal end thereof.

* * * * *